United States Patent Office 3,412,117
Patented Nov. 19, 1968

3,412,117
PREPARATION OF HEAVY METAL COMPLEX SALTS OF ETHYLENEBISDITHIOCARBAMIC ACID AND DIMETHYLDITHIOCARBAMIC ACID
Emilio Gagliardini, Milan, Italy, assignor to SIPCAM—Societa Italiana Prodotti Chimici e per l'Agricoltura Milan S.p.A., Milan, Italy, an Italian company
No Drawing. Filed Feb. 3, 1964, Ser. No. 342,235
Claims priority, application Italy, Feb. 14, 1963, 31,915/63
8 Claims. (Cl. 260—429)

ABSTRACT OF THE DISCLOSURE

Heavy metal complexes of ethylenebisdithiocarbamates and dimethyldithiocarbamates are prepared by reacting a solution containing about 71 parts of an alkaline salt of ethylenedisdithiocarbamic acid and about 19 parts of the same cation salt of dimethyldithiocarbamic acid with a soluble salt of zinc, divalent iron or divalent manganese. The resulting complex salt precipitate has unexpectedly high fungicidal activity at low concentrations.

---

This invention relates to fungicidal compounds. More particularly this invention relates to a process for the preparation of a fungicidal compound of increased biological activity, and to the compound itself obtained by such process.

During the past few years, several dithiocarbamic acid derivatives have demonstrated acceptable practical use as fungicides replacing copper salts. Such derivatives, that have as a fundamental chemical nucleus the group

are used in the form of salts or of oxidation derivatives of the SH group. The following are among the most successful products of this kind: zinc, iron, manganese and sodium salts of the ethylenebisdithiocarbamic, dimethyldithiocarbamic and monomethyldithiocarbamic acids, and tetramethyl thiuram disulfide, which is obtained from dimethylthiocarbamic acid through an oxidizing process.

These various compounds show a different biological activity upon the several existing types of fungi, and therefore they have well defined indications as to their practical use. The different behaviour of the compounds is connected to the chemical nature of the starting amine employed in the preparation of the substituted dithiocarbamic acid, to the particular metal used (in the case of salts), and to the possible SH group oxidation processes. Besides, their fungicidal activity is also connected to some complex structures that such substances may acquire and to certain possible transformation products, whose nature, as well as the reaction leading to their formation, are as yet obscure, although closely connected with the various molecule constituents. Among these dithiocarbamates, zinc ethylenedibisdithiocarbamate and zinc dimethyldithiocarbamate have met with particular success and are now widely known under the trade names of Zineb and Ziram respectively. They are prepared following a general synthesis procedure that consists in reacting ethylenediamine or dimethylamine with carbon disulfide in a medium that is rendered alkaline with ammonia or with sodium or potassium hydroxide, and then precipitating the corresponding zinc insoluble salt from the soluble alkaline salt by the addition of a soluble zinc salt solution (usually the sulfate or chloride). These zinc salts, once separated and dried, constitute the corresponding commercial products.

According to this invention, a fungicidal compound possessing a high biological activity is produced using a soluble salt of a polyvalent metal—especially zinc, iron or manganese—to accomplish the aforesaid precipitation, which is carried out in a solution that contains a mixture of the soluble alkaline salts of both ethylenebisdithiocarbamic acid and dimethyldithiocarbamic acid. By this process there is obtained a salt whose chemical and biological properties are considerably different from those of the single chemical compounds obtained through the precipitation of solutions containing but one of said organic salts, for instance only the salt deriving from ethylenediamine or only the salt deriving from dimethylamine. The salt obtained according to the process of this invention contains percentages of the constituents that vary according to the percentages of the components of the mixture undergoing precipitation. It shows a surprisingly high fungicidal activity.

The experiments that were conducted proved that the most valuable results are reached when a soluble zinc, iron or manganese salt is reacted with a solution containing the two mentioned alkaline salts in the ratio of 21 parts of dimethyldithiocarbamade to 79 parts of ethylenebisdithiocarbamate.

The thus obtained compound is decidedly different from the products that can be obtained from separate solutions of the former and the latter salt, used according to the conventional technique that was summarized. That much can be evidenced by the fact that the compound obtained by the process of this invention is very slightly soluble in chloroform, which proves that it is a mixed salt, different as for nature and properties from those obtained by the reported conventional processes.

The biological activity of this compound is considerably higher than that which is usually exerted upon fungi by conventional products, and this is of course important considering when seeking an inexpensive fungicidal treatment. As a matter of fact, the amount of the compound of this invention that is necessary for any particular treatment is always equal to less than one third of the amount normally employed when using other known compounds, and besides, the activity spectrum of the compound of this invention is considerably wider. To support such statement and to further explain the matter, some comparative data are reported in the following table, concerning the amounts of Zineb and of the product of this invention that are required to obtain a similar effect upon different types of fungi. The numbers in the table are parts per million by weight.

TABLE

| Fungus | Zineb | Compound of this invention |
| --- | --- | --- |
| Endothia parasitica | 8 | 2 |
| Deutorophoma Tracheiphilia | 64 | 8 |
| Alternaria solani | 128 | 8 |
| Ustilago zeae | 8 | 2 |
| Steuphileus sarc | 9.2 | 3.1 |

It is also important to point out that a mixture of ethylenebisdithiocarbamate and dimethyldithiocarbamate (in a ratio corresponding to that of ethylenediamine to dimethylamine in the starting alkaline solution of the process of this invention) prepared mechanically from the two compounds, shows a fungicidal activity that is always several times lower than that shown by the compound of this invention. This proves once more that the compound prepared through the claimed process is decidedly different and much improved as compared to known products. Some examples of preparation of the high-biological-activity fungicidal compound of this invention that can be prepared by the claimed process are reported hereinafter as a further illustration of the process of this invention.

EXAMPLE I

Three thousand liters of an aqueous solution containing 51 kg. of zinc chloride are placed in a 5,000-liter vat, followed by 700 liters of a solution containing 19 kg. of ammonium dimethyldithiocarbamate and 71 kg. of ammonium ethylenebisdithiocarbamate, which are added with stirring. The obtained precipitate is collected and dried according to conventional methods.

EXAMPLE II

Three thousand liters of an aqueous solution containing 105 kg. of ferrous sulfate are placed in a 5,000-liter vat, followed by 700 liters of a solution containing 19 kg. of ammonium dimethyldithiocarbamate and 71 kg. of ammonium ethylenebisdithiocarbamate, which are added with stirring. The obtained precipitate is collected and dried according to conventional methods.

EXAMPLE III

Three thousand liters of an aqueous solution containing 85 kg. of manganese sulfate are placed in a 5,000-liter vat, followed by 700 liters of a solution containing 19 kg. of ammonium dimethyldithiocarbamate and 71 kg. of ammonium ethylenebisdithiocarbamate, which are added with stirring. The obtained precipitate is collected and dried according to conventional methods.

Instead of being collected and dried, the precipitate can be used in appropriate formulations.

The products obtained by the process of this invention, for instance according to the reported examples, is applied in the conventional way by sprinkling it as a powder or by spraying it in the form of a solution.

What is claimed is:

1. The process for the production of highly fungicidal compound comprising precipitating said compound from a mixture of 71 parts of an alkaline salt of ethylenebisdithiocarbamic acid and 19 parts of the same cation salt of dimethyldithiocarbamic acid by adding to said solution a salt of a metal from the group consisting of zinc, divalent iron and divalent manganese which salt is soluble in said solution.

2. The process according to claim 1, wherein the anion is ammonium and the metal salt is zinc chloride.

3. The process according to claim 1, wherein the anion is ammonium and the metal salt is ferrous sulfate.

4. The process according to claim 1, wherein the anion is ammonium, and the metal salt is manganese sulfate.

5. The dithiocarbamate compound produced by reacting a salt of a metal from the group consisting of zinc, divalent iron and divalent manganese with a mixture of 71 parts of the ammonium salt of ethylenebisdithiocarbamic acid and 19 parts of the ammonium salt of dimethyldithiocarbamic acid, said compound being highly fungicidal.

6. The compound of claim 5 in which the metal salt is zinc chloride.

7. The compound of claim 5 in which the metal salt is ferrous sulfate.

8. The compound of claim 5 in which the metal salt is manganese sulfate.

References Cited

UNITED STATES PATENTS

| 2,861,091 | 11/1958 | Beauchamp et al. | 167—22 |
| 2,992,161 | 7/1961 | Flenner | 167—22 |
| 3,050,552 | 8/1962 | Nemec et al. | 167—22 |
| 3,067,090 | 12/1962 | Groningen | 167—22 |
| 2,342,332 | 2/1944 | Dean | 260—429.9 |
| 2,342,481 | 2/1944 | Muller | 260—429.9 |
| 3,067,090 | 12/1962 | Groningen | 167—22 |
| 3,085,042 | 4/1963 | Luginbuhl | 167—22 |
| 3,070,491 | 12/1962 | Heusch et al. | 167—22 |

FOREIGN PATENTS

| 938,024 | 9/1963 | Great Britain. |
| 1,136,527 | 9/1962 | Germany. |

OTHER REFERENCES

Derwent Belgian Patents Report No. 92B, Derwent Information Service, Rochdale House, London, Oct. 12, 1962 (title page and abstract 613461).

TOBIAS E. LEVOW, *Primary Examiner.*

A. P. DEMERS, *Assistant Examiner.*